United States Patent [19]

Kristy

[11] Patent Number: 5,218,455
[45] Date of Patent: Jun. 8, 1993

[54] MULTIRESOLUTION DIGITAL IMAGERY PHOTOFINISHING SYSTEM

[75] Inventor: Stephen H. Kristy, Fairport, N.Y.

[73] Assignee: Eastman Kodak Company, Rochester, N.Y.

[21] Appl. No.: 582,305

[22] Filed: Sep. 14, 1990

[51] Int. Cl.$^5$ .............................................. H04N 1/40
[52] U.S. Cl. ..................................... 358/403; 340/723
[58] Field of Search .................... 382/41, 54; 358/406, 358/403, 443, 447, 448; 340/723, 799

[56] References Cited

U.S. PATENT DOCUMENTS

| | | | |
|---|---|---|---|
| 4,656,524 | 4/1987 | Norris et al. | 358/280 |
| 4,656,525 | 4/1987 | Norris | 358/280 |
| 4,974,197 | 11/1990 | Blount et al. | 364/900 |
| 5,058,185 | 10/1991 | Morris et al. | 382/41 |
| 5,119,081 | 6/1992 | Ikehira | 340/723 |

OTHER PUBLICATIONS

Salon Works Deluxe Series 1005 by: Your Image.

Primary Examiner—Edward L. Coles, Sr.
Assistant Examiner—Jerome Grant, II
Attorney, Agent, or Firm—Edward Dugas

[57] ABSTRACT

A photoprocessing, photofinishing apparatus enables an unskilled consumer to personally customize and obtain high quality prints of photographic images without the intervention of a skilled technician. It also provides for the storage and retrieval of high resolution digitized color still images for playback to a variety of reproduction devices. The apparatus comprises a high resolution film scanner which scans 35 mm film and outputs high resolution image signals. These signals are digitized and coupled to a host image data processing unit, which stores each image file in a multiresolution, hierarchical format that facilitates retrieval of images for reproduction by a variety of devices the resolution of which may vary from device to device, such as a low/moderate NTSC television monitor or a very high resolution color thermal printer. The host processor is coupled to an interactive display terminal, through which the customer may manipulate a low resolution version of a selected image file. The apparatus may also be used by a skilled photofinishing minilab operator to produce a permanent record of images that have been digitized from one or more photographic image sources. In this application, the host computer may be coupled to drive an optical compact disc recorder which writes each hierarchical image file and an appended header file to an optical compact disc. The customer may then play back the disc on a CD player modified for display on a home television monitor.

25 Claims, 1 Drawing Sheet

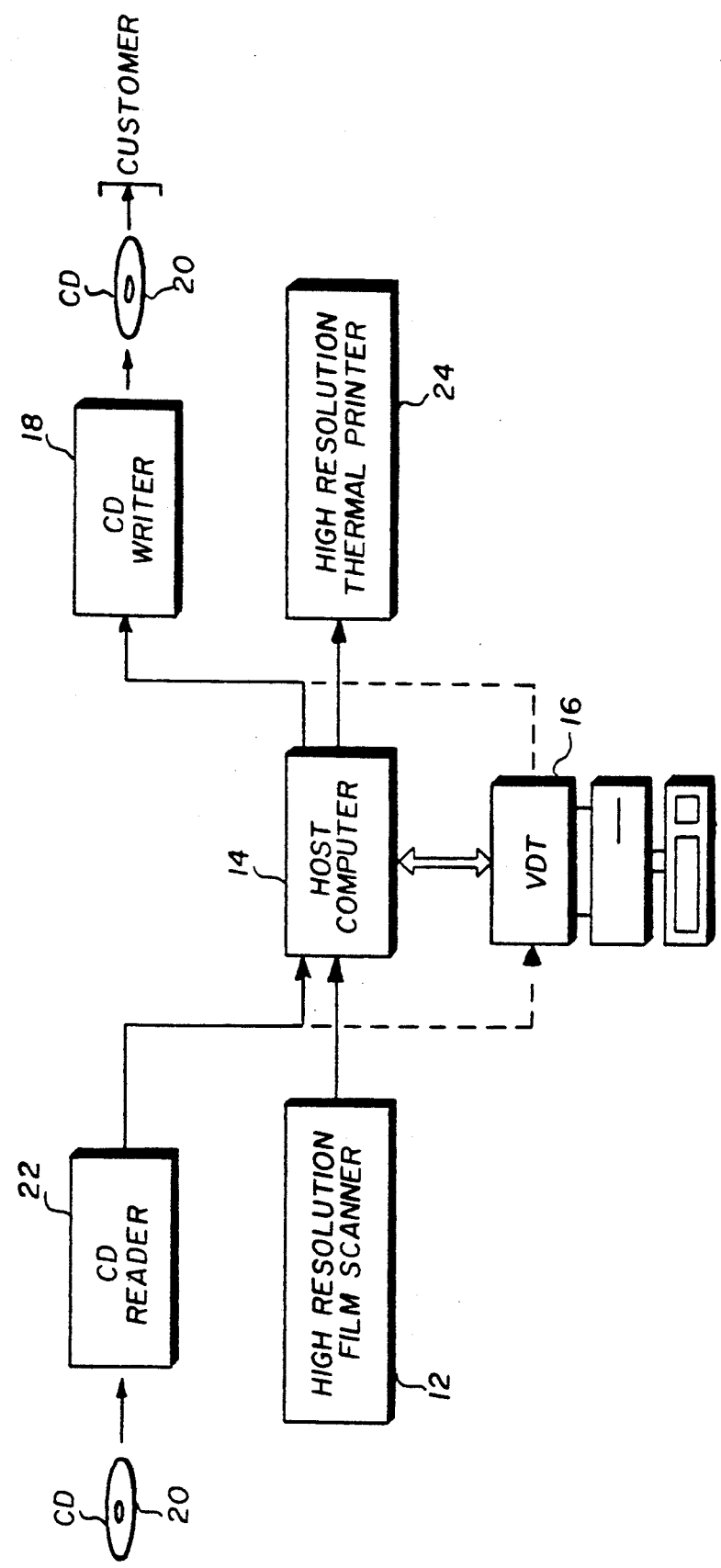

MULTIRESOLUTION DIGITAL IMAGERY PHOTOFINISHING SYSTEM

FIELD OF THE INVENTION

The present invention relates in general to photofinishing systems and is particularly directed to a system for photofinishing still color photographic images, such as those captured on a 35 mm negative film strip, through the use of digital data processing for storage, image processing (e.g. scene enhancement, enlargement, cropping) and reproduction (e.g. display, high resolution printing).

BACKGROUND OF THE INVENTION

The photofinishing of consumer-generated still photographs, such as images captured on a roll of 35 mm color film, whether by a customer/photographer delivering an exposed roll of film to a professional photofinisher or commercial minilab, or through the use of a stand alone, quasi 'instant' processing system, that permits the customer to input control parameters directly into the film processing hardware, customarily employs an analog electro-optic system and an associated chemical-based print developing unit. The electro-optic system typically contains a film-scanning camera and an associated display monitor through which the user, such as a minilab operator possessing working knowledge of the equipment and the necessary film developing chemistry, views each image and 'sets up' the focusing geometry of a set of imaging lenses, through which the image on the viewed film frame is projected onto a light sensitive print paper. The exposed print paper is then chemically developed into a hard copy print, which is to be supplied to the customer. Because such conventional photofinishing equipment is essentially comprised of analog hardware the processing capabilities of which are limited and the skilled operation of which is costly and time consuming, the print options offered to the customer are usually confined to a preestablished set of reproduction parameters, particularly in the case of stand alone 'instant' print equipment and short turn around minilab services offered by general retail sales establishments.

SUMMARY OF THE INVENTION

In accordance with the present invention, there is provided a new and improved photoprocessing, photofinishing apparatus which furnishes the unskilled consumer with the ability to personally customize and obtain high quality prints of photographic images without the intervention of a skilled technician. In addition, it provides for the storage and retrieval of high resolution digitized color still images for playback to a variety of reproduction devices.

More particularly, the photofinishing apparatus according to the present invention comprises a high resolution opto-electronic scanner which scans still photographic images that have been captured on a customer's photographic recording medium, such as a roll of 35 mm film. The scanner outputs high resolution image signals which are representative of the response characteristics of its high resolution imaging pixel array to a scanned image. The image signals are digitized and coupled to a host image data processing unit. The image data processing unit contains an image encoding and storage mechanism through which each high resolution digitized image file is stored in a multiresolution, hierarchical format. This multiresolution, hierarchical format facilitates retrieval of images for reproduction by a variety of devices the resolution of which may vary from device to device, such as a low/moderate NTSC television monitor or a very high resolution color thermal printer. The host processor is coupled to an interactive display terminal, through which the customer may manipulate the low resolution version (e.g. $128 \times 192$ pixel sub-array) of a selected image file. The interactive terminal is driven by a reduced complexity computer graphics program to provide the customer with the ability to access menu-driven image manipulation functions, such as the addition of text to the image, zoom, crop, and tone and color corrections of the low resolution image of a selected file. Once the customer is satisfied with the customization of the displayed low resolution image, its (non-displayed) highest resolution image ($2024 \times 3072$ pixel array) file is processed using the customer's entered selections to drive an associated high resolution thermal printer, which then supplies the customer with a high quality hard copy print of the processed image.

The storage and retrieval system of the present invention may be used by a skilled photofinishing minilab operator to produce a permanent record of images that have been digitized from one or more photographic image sources (e.g. 35 mm film). In this application, the host computer may be coupled to drive an optical compact disc recorder which writes each hierarchical image file and an appended header file to an optical compact disc. In a commercial application, the disc is then supplied to the customer who brought in the 35 mm film for processing. The customer may then play back the disc on a CD player for display on a home television monitor.

BRIEF DESCRIPTION OF THE DRAWINGS

The single figure diagrammatically illustrates an embodiment of a high resolution photoprocessing, photofinishing apparatus in accordance with the present invention.

DETAILED DESCRIPTION

Before describing in detail the particular improved multi-resolution digital image storage and retrieval system in accordance with the present invention, it should be observed that the present invention resides primarily in a novel structural combination of conventional signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the FIGURE do not necessarily represent the mechanical structural arrangement of the exemplary system, but are primarily intended to illustrate the major structural components of the system in a convenient functional grouping, whereby the present invention may be more readily understood.

The single figure diagrammatically illustrates an embodiment of a high resolution photofinishing apparatus in accordance with the present invention. As shown in the FIGURE, the apparatus includes a high resolution opto-electronic film scanner 12, the output of which is coupled to a host processor 14. Scanner 12 preferably comprises a commercially available Eikonix Model 1435 high resolution scanner, having a very high resolution sensor pixel array (a 3072×2048 pixel matrix) capable of generating high spatial density-representative output signals which, when converted into digital format, provide 'digitized' photographic image files from which high quality prints may be obtained. Scanner 12 is shown as being optically coupled with a photographic recording medium, such as a 35 mm film strip 16, which contains a plurality (e.g. a set of twenty-four or thirty-six) 36 mm×24 mm image frames. For each scanned image frame, scanner 12 outputs digitally encoded data, representative of the opto-electronic response of its high resolution imaging sensor pixel array onto which a respective photographic image frame of film strip 10 is projected by the scanner's input lens system. This digitally encoded data, or 'digitized' image, is coupled in the form of an imaging pixel array-representative bit map, resolved to a prescribed code width (e.g. eight bits per color per pixel), to host processor 14.

Host processor 14 contains an image encoding and storage operator through which each high resolution digitized image file is stored in a multiresolution, hierarchical format. The use of a multiresolution storage format facilitates retrieval of images for reproduction by a variety of devices the resolution of which may vary from device to device, such as a low/moderate NTSC television monitor or a very high resolution color thermal printer. One example of a preferred encoding and storage operator that may be used for this purpose is described in U.S. Pat. No. 4,969,204, issued: Nov. 6, 1990, entitled: HYBRID RESIDUAL-BASED HIERARCHICAL STORAGE AND DISPLAY METHOD FOR HIGH RESOLUTION DIGITAL IMAGES IN A MULTIUSE ENVIRONMENT by Paul W. Melynchuck et al, assigned to the assignee of the present application and the disclosure of which is herein incorporated.

As described in the Melynchuck et al application, an original 2048×3072 (2K×3K) high resolution image is iteratively 'down-converted' into a hierarchical set of respectively different resolution residue images and a base resolution image file. The base file may comprise a 512×768 pixel array file formatted as a set of four interlaced (256 lines by 384 pixels/line) lowest resolution image sub-arrays, respectively corresponding to odd pixel/odd line, odd pixel/even line, even pixel/odd line, even pixel/even line sub-arrays. One of the lowest resolution image 256×384 sub-arrays is suitable for preliminary display on an NTSC-quality video monitor, while the full 512×768 base resolution array provides a high quality image on a an NTSC video monitor. An individual lowest resolution 256×384 sub-array may be further sub-sampled to obtain one or more lower resolution files (e.g. a 128×192 pixel sub-array) for supporting the display of one or more relatively smaller images, as will be explained below.

The spatial parameters of each of the hierarchical image files into which an original 2K×3K file is encoded and stored are chosen to facilitate the implementation and incorporation of a low cost, reduced complexity frame store/data retrieval architecture into a variety of playback devices, such as an optical compact disc player, thereby providing for rapid call-up and display of one or more selected images, as by way of an NTSC television monitor. For this purpose, host computer 14 is coupled with one or more interactive video display terminals 16 through which digitized image files may be controllably called up for display to a user.

In accordance with a first application of the present invention, the person using video terminal 16 may be a skilled photofinishing minilab operator who controls the creation of a permanent record of images that have been digitized from one or more photographic image sources (e.g. one or more rolls of 35 mm film). For this purpose, host computer 14 may be coupled to drive an optical compact disc recorder 18, which writes each hierarchical image file to an output disc 20. In a commercial photofinishing application, disc 20 is prepared for a customer who brought in one or more rolls of 35 mm film to the photofinisher for processing. The customer may then play back the disc, for display on a commercial television set, on a CD player modified as described in co-pending U.S. patent application Ser. No. 582,727, filed Sep. 14, 1990, by D. Funston et al, entitled "Auxiliary Removable Memory For Storing Image Parameter Data", assigned to the assignee of the present application and the disclosure of which is herein incorporated, The (512×768) resolution of the base image readily accommodates the (485×640) resolution of an NTSC TV monitor.

Preferably, the disc storage mechanism employed by the minilab operator incorporates a composite index file of the type described in co-pending patent application Ser. No. 583,063, filed Sep. 14, 1990, by K. Parulski et al, entitled "Image Database Incorporating Low Resolution Index Image Data," assigned to the assignee of the present application and the disclosure of which is herein incorporated. In accordance with the storage mechanism described in that Parulski et al application, in addition to writing each hierarchical encoded image file to the disc, the host processor also records a 'composite', index image file. This index file contains a plurality of very low resolution (e.g. 128×192 pixel sub-array) images, one for each high resolution image files. As a consequence, by accessing the index file the user can display a montage of miniature images, so as to permit rapid viewing of each image of a stored plurality, e.g. a 24 or 36 frame set stored on the disc, thereby facilitating the location of a particular image. Accompanying each low resolution image within the index file is an identifier that points to its associated high resolution image file, so that the viewer may readily access and process a particular image. This composite index file feature is particularly useful for photofinishing operations, for example, where a customer who had been previously supplied with a compact disc returns to the photofinisher for further image processing and prints. The fact that the disc contains the composite index greatly speeds up the process of locating a particular file for a requested photofinishing operation.

In order to facilitate use of each image file by a variety of output devices, for example a home CD player which drives a customer's television set, or a high resolution thermal printer employed by the photofinisher to supply high quality color prints to the customer, each image digitized by scanner 12 and encoded by host processor 14 is stored on the disc 'as is', regardless of its orientation on the film. In addition, annexed to each image file is a header file which contains orientation, aspect ratio and other photofinisher-generated information. In the case of playback on a CD player, for example, the header file is readable by the player's data retrieval microcontroller to control the interfacing of the base resolution image file from the compact disc to a reproduction device (e.g. customer's TV display). Several preferred embodiments of a storage and retrieval mechanism that employs such a header file are described in co-pending patent application Ser. No. 583,265, filed Sep. 14, 1990, entitled: "Mechanism for Controlling Presentation of Displayed Image," by K. Parulski et al, and co-pending patent application Ser. No. 809,365, filed Dec. 18, 1991, entitled "Storage and Retrieval of Digitized Photographic Images," by M. Axman et al, assigned to the assignee of the present application and the disclosures of which are herein incorporated.

In accordance with a second application of the present invention, the person using video terminal 16 may be an unskilled consumer who has presented to the photofinishing facility a new roll of 35 mm film or perhaps a previously prepared compact disc for the purpose of having prints made from one or more images on the film or disc. Where the customer supplies a previously prepared optical disc, 20 the disc 20 is inserted in a disc reader 22, which may be coupled to the host computer or the customer's VDT. In this application, the control mechanism that drives the video display terminal may contain a simplified or edited version of bit map manipulation software, such as that supplied by a computer graphics vendor, which provides the customer with the ability to access menu-driven image manipulation functions, such as the addition of text to the image, zoom, crop, and tone and color corrections of a low resolution (128×192) image of a selected file. Once the customer is satisfied with what is displayed on the screen, its corresponding highest resolution image (2K×3K) image is processed using the customer's entered selections to drive an associated high resolution thermal printer 24, which then supplies the customer with a high quality hard copy print of the processed image.

Non-limitative examples of readily coded image processing algorithms that may be used for this purpose include those described in the published literature, such as "Digital Image Processing" by William K. Pratt, in particular, Chapters 4, 12 and 16, respectively entitled "Image Sampling and Reconstruction," "Image Enhancement" and "Luminance, Color, and Spectral Image Restoration," 1978 John Wiley and Sons, ISBN 0-471-01888-0; and "Digital Image Processing" by Rafel C. Gonzalez, in particular, Chapter 4, entitled "Image Enhancement," 1983 Addison-Wesley Publishing Company, Inc. ISBN 0-201-02596-5.

Many of such image processing algorithms have been implemented as commercially available packages (which perform all functions on the highest resolution data, so that, without the hierarchical scheme employed in the above-referenced Melynchuck application, they are slower). Their encoding schemes are optimized for performance and are commercially available as libraries of subroutines, such as MathPAK 87 (a trademark of Precision Plus Software). Additional image processing software that may be used includes Photoshop (trademark of Adobe Systems Incorporated), ColorStudio (trademark of Letraset) and PhotoMac (trademark of Avalon Development Group).

As will be appreciated from the foregoing description, the photoprocessing, photofinishing apparatus according to the present invention equips the unskilled consumer with the ability to personally customize and obtain high quality prints of photographic images without the intervention of a skilled technician, and also may be used by a skilled photofinishing minilab operator to produce a permanent record of images that have been digitized from one or more photographic image sources for playback to a variety of reproduction devices.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A digitized image processing system comprising, in combination:
    a high resolution opto-electronic scanner which scans still photographic images that have been captured on a photographic recording medium and outputs a high resolution digitized image file for each scanned image;
    an image data processing unit, which is operative to receive high resolution digitized image files output by said scanner and stores each of said high resolution digitized image files in the form of a hierarchical set of respectively different resolution images and a base resolution image file;
    a video display terminal, coupled with said image data processing unit, and being operative to display a low resolution representation of at least one of the high resolution image files stored by said image data processing unit, and and being operative to controllably input image parameter information in response to which said image data processing unit defines reproduction characteristics of the low resolution image displayed by said video display terminal and an associated high resolution digitized image file stored thereby; and
    a reproduction unit, coupled to said image data processing unit, and being operative to generate a high resolution reproduction of the image digitized in said selected high resolution digitized image file, reproduction characteristics of which have been defined in accordance with image parameter information controllably input via said video display terminal.

2. A system according to claim 1, wherein said plurality of higher resolution image files associated with respectively different degrees of image resolution correspond to higher resolution residual image files which, when iteratively combined with said base resolution image, produce respectively higher resolution images.

3. A system according to claim 1, further including an output unit, coupled to said image data processing unit, and being operative to store, on a transportable digital data storage medium, each of the high resolution digitized image files that have been stored by said image data processing unit in the form of a base resolution image bit map file and a plurality of higher resolution image files associated with respectively different degrees of image resolution.

4. A system according to claim 3, wherein said transportable digital data storage medium comprises an optical compact disc and said output unit comprises unit for writing high resolution digitized image files stored by said image processing unit onto said optical compact disc.

5. A system according to claim 1, further including an input device, coupled to read the contents of a transportable digital data storage medium containing at least one high resolution digitized image file that has been stored thereon in the form of a base resolution image bit map file and a plurality of higher resolution image files associated with respectively different degrees of image resolution, and coupling the image data contained therein to said image data processing unit.

6. A digitized image processing system according to claim 1, wherein said image parameter information includes a plurality of the following: the addition of text to the image, zoom, crop, tone and color corrections.

7. A digitized image processing system comprising, in combination:
- an image data processing unit, coupled to receive at least one high resolution digitized image file representative of a high resolution digitization of a still photographic image that has been captured on a photographic recording medium, said at least one high resolution digitized image file being stored by said image data processing unit in the form of a hierarchical set of respectively different resolution images and a base resolution image file;
- a display terminal, coupled with said image data processing unit, for displaying a low resolution representation of said at least one of the high resolution digitized image file stored by said image data processing unit, and being operative to controllably input image parameter information in response to which said image data processing unit defines reproduction characteristics of the low resolution image displayed by said display terminal and an associated high resolution digitized image file stored thereby; and
- a reproduction device, coupled to said image data processing unit and being operative to generate a high resolution reproduction of the image digitized in said selected high resolution digitized image file, reproduction characteristics of which have been defined in accordance with image parameter information controllably input via said video display terminal.

8. A system according to claim 7, wherein said plurality of higher resolution image files associated with respectively different degrees of image resolution correspond to higher resolution residual image files which, when iteratively combined with said base resolution image, produce respectively higher resolution images.

9. A system according to claim 7, further including an output device, coupled to said image data processing unit and being operative to store, on a transportable digital data storage medium, each of the high resolution digitized image files that have been stored by said image data processing unit in the form of a base resolution image bit map file and a plurality of higher resolution image files associated with respectively different degrees of image resolution.

10. A system according to claim 9, wherein said transportable digital data storage medium comprises an optical compact disc and wherein said output device is operative to write high resolution digitized image files stored by said image processing unit on said optical compact disc.

11. A digitized image processing system according to claim 7, wherein said image parameter information includes a plurality of the following: the addition of text to the image, zoom, crop, tone and color corrections.

12. A high resolution photofinishing apparatus comprising, in combination:
- a high resolution opto-electronic scanner which scans still photographic images that have been captured on a photographic recording medium and outputs, for each scanned image, a high resolution digitized image file the contents of which are associated with an M X N array of pixel locations of the scanned image;
- an image data processing unit which is coupled to receive high resolution digitized image files output by said scanner and converts each of the high resolution digitized image files to a base resolution image bit map file the contents of which are associated with a J X K sub-array of pixel values, where J<M and K<N, and an associated plurality of higher resolution image files having respectively different degrees of image resolution;
- an interactive display terminal, which is coupled with said image data processing unit and displays a low resolution representation of at least one of the high resolution digitized image files stored by said image data processing unit, said interactive display terminal being coupled to receive image parameter-representative input signals in response to which said image data processing unit defines reproduction characteristics of the low resolution image displayed by said interactive display terminal and an associated high resolution digitized image file stored thereby; and
- a high resolution color printer, which is coupled to said image data processing unit and prints a high resolution reproduction of the image digitized in said selected high resolution digitized image file, reproduction characteristics of which have been defined in accordance with image parameter-representative input signals supplied by way of said interactive display terminal.

13. A high resolution photofinishing apparatus according to claim 12, further including an output image data recorder, which is coupled to said image data processing unit and controllably stores, on a transportable digital data storage medium, at least one high resolution digitized image file that has been converted into a base resolution image bit map file and an associated plurality of higher resolution image files having respectively different degrees of image resolution.

14. A high resolution photofinishing apparatus according to claim 13, wherein said transportable digital data storage medium comprises an optical compact disc and said output image data recorder comprises an optical compact disc recorder for recording at least one high resolution digitized image file stored by said image processing unit on said optical compact disc.

15. A high resolution photofinishing apparatus according to claim 12, further including a digital data retrieval unit, coupled to read the contents digital of a transportable digital data storage medium containing at least one high resolution digitized image file that has been stored thereon in the form of a base resolution image bit map file and a plurality of higher resolution image files associated with respectively different degrees of image resolution, and coupling the image data contained therein to said image data processing unit.

16. A high resolution photofinishing apparatus according to claim 12, wherein said plurality of higher resolution image files associated with respectively different degrees of image resolution correspond to higher resolution residual image files which, when iteratively combined with said base resolution image, produce respectively higher resolution images.

17. A high resolution photofinishing apparatus according to claim 12, wherein said image parameter information includes a plurality of the following: the addition of text to the image, zoom, crop, tone and color corrections.

18. A high resolution photofinishing apparatus comprising, in combination:

a high resolution opto-electronic scanner which scans still photographic images that have been captured on a photographic recording medium and outputs, for each scanned image, a high resolution digitized image file the contents of which are associated with an array of pixel locations of the scanned image;

an image data processing unit, coupled to receive high resolution digitized image files output by said scanner and converting each of the high resolution digitized image files output by said scanner into a plurality of image files the contents of respective ones of which are representative of image bit map files having respectively different degrees of image resolution;

an interactive display terminal, which is coupled with said image data processing unit and displays a low resolution representation of at least one of the high resolution image files stored by said image data processing unit, said interactive display terminal being coupled to receive image parameter-representative input signals in response to which said image data processing defines reproduction characteristics of the low resolution image displayed by said interactive display terminal and an associated high resolution digitized image file stored thereby; and a high resolution color printer, which is coupled to said image data processing unit and prints a high resolution reproduction of the image digitized in said selected high resolution digitized image file, reproduction characteristics of which have been defined in accordance with image parameter-representative input signals supplied by way of said interactive display terminal.

19. A high resolution photofinishing apparatus according to claim 18, further including an output image data recorder, which is coupled to said image data processing unit and controllably stores, on a transportable digital data storage medium, at least one high resolution digitized image file that has been converted into a base resolution image bit map file and an associated plurality of higher resolution image files having respectively different degrees of image resolution.

20. A high resolution photofinishing apparatus according to claim 19, wherein said transportable digital data storage medium comprises an optical compact disc and said output image data recorder comprises an optical compact disc recorder for recording at least one high resolution digitized image file stored by said image processing unit on said optical compact disc.

21. A high resolution photofinishing apparatus according to claim 19, further including a digital data retrieval unit, coupled to read the contents of a transportable digital data storage medium containing at least one high resolution digitized image file that has been stored thereon in the form of a base resolution image bit map file and a plurality of higher resolution image files associated with respectively different degrees of image resolution, and coupling the image data contained therein to said image data processing unit.

22. A high resolution photofinishing apparatus according to claim 18, wherein said image parameter information includes a plurality of the following: the addition of text to the image, zoom, crop, tone and color corrections.

23. A method of providing a hardcopy color reproduction of a still color photographic image that has been captured on a photographic recording medium comprising the steps of:

(a) producing, from said color photographic image, an associated high resolution digitized image have an M X N array of pixel locations;

(b) converting said high resolution digitized image file into a base resolution image bit map file the contents of which are associated with a J X K sub-array of pixel values, where J<M and K<N, and an associated hierarchy of higher resolution image files having respectively different degrees of image resolution greater than said base resolution image file but less than the high resolution image file produced in step (a);

(c) displaying, by way of an interactive display terminal, a low resolution image derived from either said base resolution image file or one of said associated hierarchy of higher resolution image files other than said high resolution digitized image file;

(d) modifying, in accordance with image parameter-representative control signals applied to said interactive display terminal, at least one attribute of each of the low resolution image displayed in step (c) and another digitized image file that has a resolution higher than the image displayed in step (c);

(e) coupling said another digitized image file that has been modified in step (d) to a high resolution color reproduction device and causing said high resolution color reproduction device to output a high resolution hardcopy color reproduction of the image digitized in said another digitized image file, and reproduction characteristics of which have been defined in accordance with image parameter-representative signals applied to said interactive display terminal in step (d).

24. A method according to claim 23, wherein said image parameter information includes a plurality of the following: the addition of text to the image, zoom, crop, tone and color corrections.

25. A method according to claim 23, wherein said hierarchy of higher resolution image files is comprised of a hierarchy of higher resolution residual image files which, when iteratively combined with said base resolution image, produce respectively higher resolution images.

* * * * *

UNITED STATES PATENT AND TRADEMARK OFFICE
CERTIFICATE OF CORRECTION

PATENT NO. : 5,218,455

DATED : June 8, 1993

INVENTOR(S) : Stephen H. Kristy

It is certified that error appears in the above-identified patent and that said Letters Patent is hereby corrected as shown below:

Column 5, line 10, after "et al," delete "and co-pending patent application Ser. No. 809,365, filed Dec. 18, 1991, entitled "Storage and Retrieval of Digitized Photographic Images," by M. Axman et al,".

Signed and Sealed this

Fifth Day of July, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,218,455
DATED : June 8, 1993
INVENTOR(S) : Stephen H. Kristy

It is certified that error appears in the above-indentified patent and that said Letters Patent is hereby corrected as shown below:

Column 6, line 66, after "comprises", please delete "unit" and substitute therefor --a device--.

Column 8, line 59, please delete "digital".

Column 10, line 21, please delete "have" and substitute therefor --having--.

Signed and Sealed this

Twenty-ninth Day of November, 1994

Attest:

BRUCE LEHMAN

*Attesting Officer*     *Commissioner of Patents and Trademarks*